Oct. 10, 1950 R. A. JEWELL 2,525,550
BRAKE

Filed Nov. 5, 1946 3 Sheets-Sheet 1

Inventor
ROBERT A. JEWELL

By Mason Fenwick & Lawrence
Attorneys

Oct. 10, 1950   R. A. JEWELL   2,525,550
BRAKE
Filed Nov. 5, 1946   3 Sheets-Sheet 2
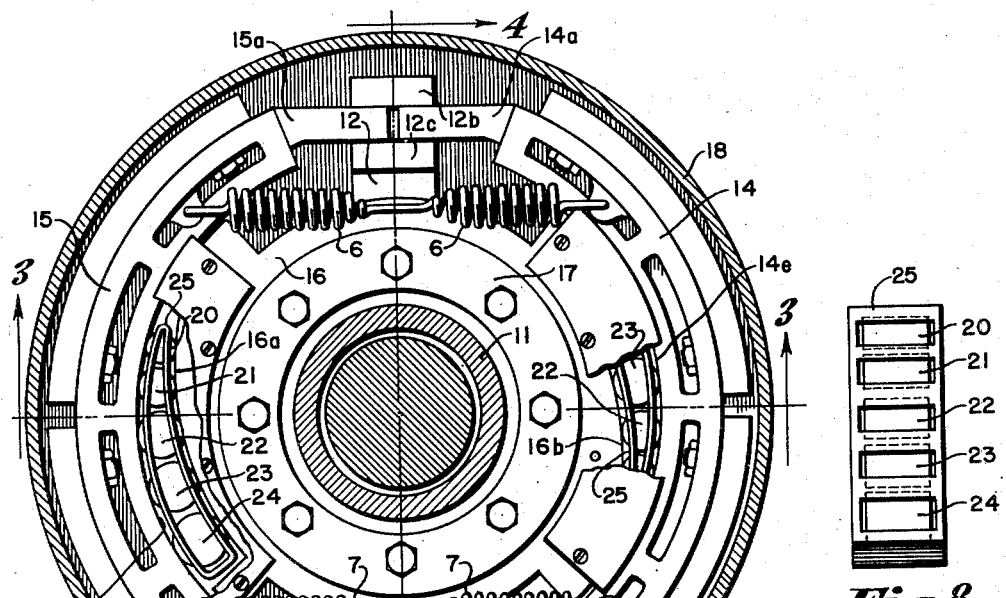
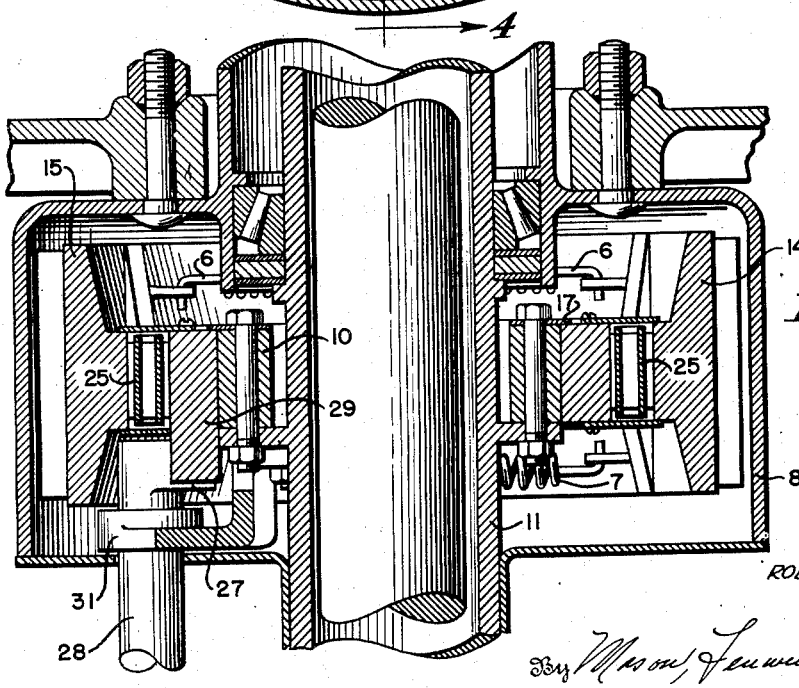
Inventor
ROBERT A. JEWELL
By Mason, Fenwick & Lawrence
Attorneys

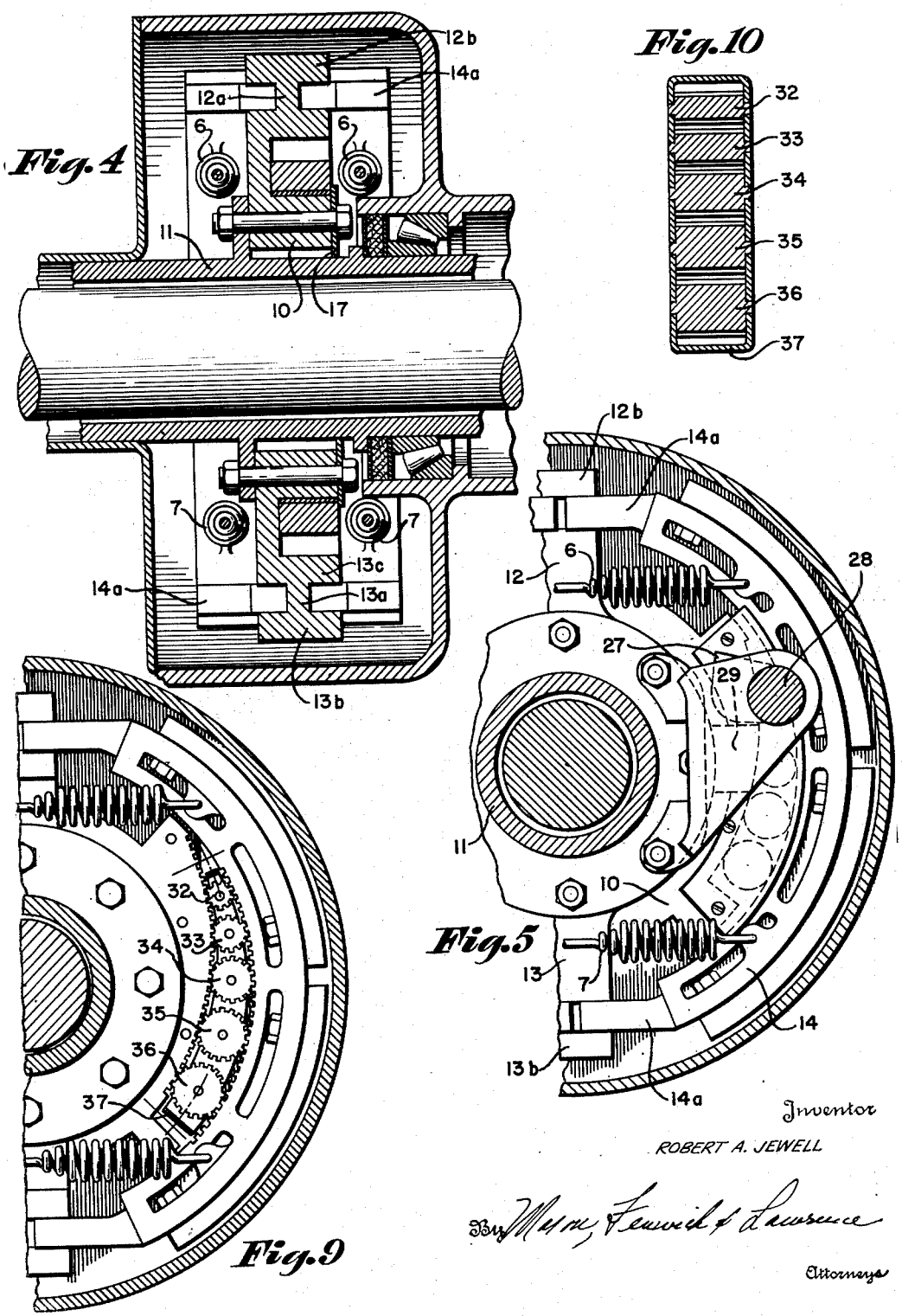

Patented Oct. 10, 1950

2,525,550

UNITED STATES PATENT OFFICE 2,525,550

BRAKE

Robert A. Jewell, Savannah, Ga., assignor to The Steel Products Co., Inc., Savannah, Ga.

Application November 5, 1946, Serial No. 707,862

2 Claims. (Cl. 188—78)

This invention relates to improvements in brakes and is particularly concerned with a brake assembly to be associated with a vehicle axle or axle housing and the associated brake drum of a vehicle wheel.

The design of a brake is a compromise between weight, simplicity, compactness and ruggedness. At the same time the brake must be capable of withstanding the high temperatures developed during the braking operation and must be so constructed that the braking forces do not produce excessive moments tending to reduce the braking pressure at one end of the shoe which might cause squeaking and unequal wear.

Heretofore various mechanisms have been provided in attempting to overcome the above difficulties. As a general rule these mechanisms are rather complicated and have not entirely overcome the difficulty of non-uniform pressure on the brake shoes which results in uneven wear. Several of these previous devices have been provided with fluid-operated actuating mechanisms so that the force is applied radially to the brake shoes, but during the braking operation, due to the method of anchoring the brake shoes, there is a tendency for the brake shoes to pivot about their anchors or the point at which the force is applied to the brake shoes with the result that much greater braking force is applied to one end of the brake shoes than at the other. In accordance with the present invention, a rotatable actuating mechanism is provided having eccentric cam thrust surfaces and in which a plurality of rolling elements, illustrated in the drawings as rollers or gears, are provided for transmitting uniform radially outward thrust over a considerable arc of the brake shoes, thereby minimizing any tendency for the braking action to develop moments on the brake shoes which would tend to produce non-uniform pressure and wear on the brake shoes.

Accordingly, one of the primary objects of the invention is to provide an improved brake in which novel means are provided for causing radial movement of the brake shoes and for reducing the moments tending to rotate the brake shoes during the braking operation.

Another object of the invention is to provide an improved brake mechanism in which the actuating thrust is distributed over a substantial portion of the arc of the brake shoe in order to ensure more uniform wear of the brake lining.

Another object is to provide improved brake mechanism in which the brake shoes are full-floating and are anchored at both ends and are provided with mechanism for distributing the actuating force throughout a substantial arc of the brake shoe.

Other and further objects will become readily apparent from the following description when considered in connection with the accompanying drawings, illustrating an embodiment of the invention, and in which:

Figure 2 is an end elevation looking from the wheel side of the brake;

Figure 3 is a worm's-eye sectional view on line 3—3 of Figure 2, looking in the direction of the arrows;

Figure 4 is a sectional elevation on the line 4—4 of Figure 2;

Figure 5 is a partial sectional elevation looking from the brake drum side of the brake assembly;

Figure 8 is a detail of the roller cage for the roller elements which apply the braking thrust to the brake shoes;

Figure 9 is a partial sectional elevation looking from the brake drum side of a modified form of the invention, in which gears are substituted for the rollers; and Figure 10 is a detail of the cage for the gears of the modified form of Fig. 9.

Figure 1:
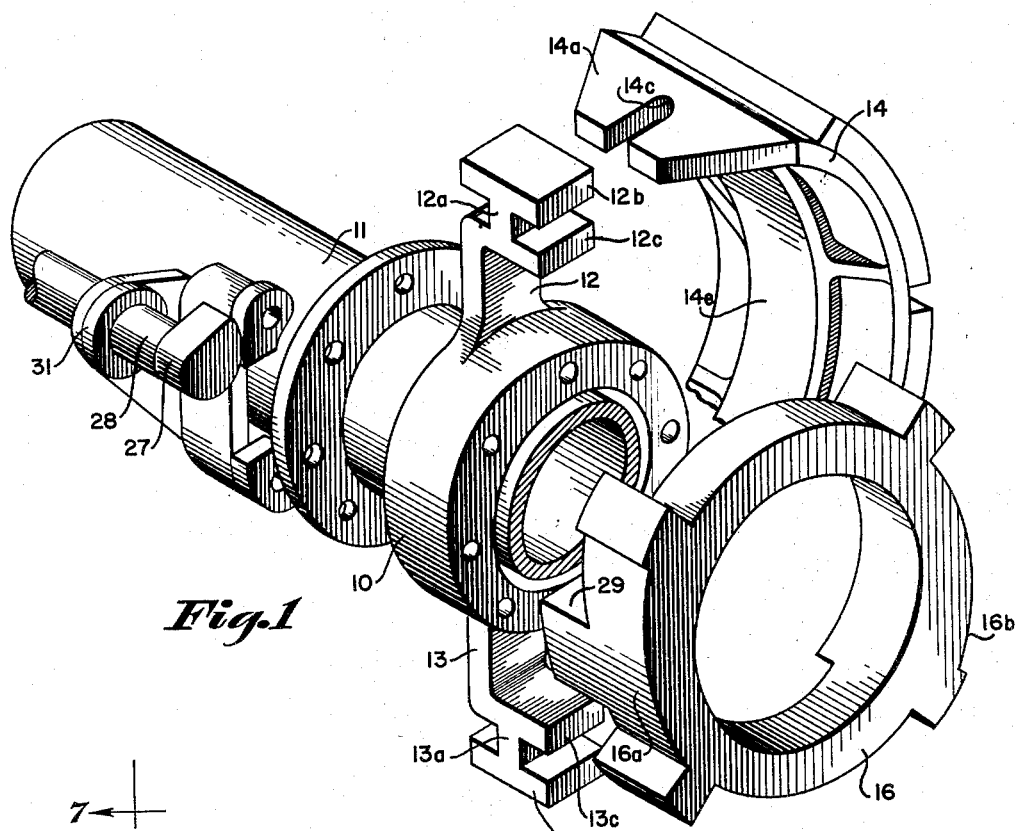
Figure 1 is an exploded perspective view of the major elements of the brake mechanism made in accordance with the present invention.
Figure 6:
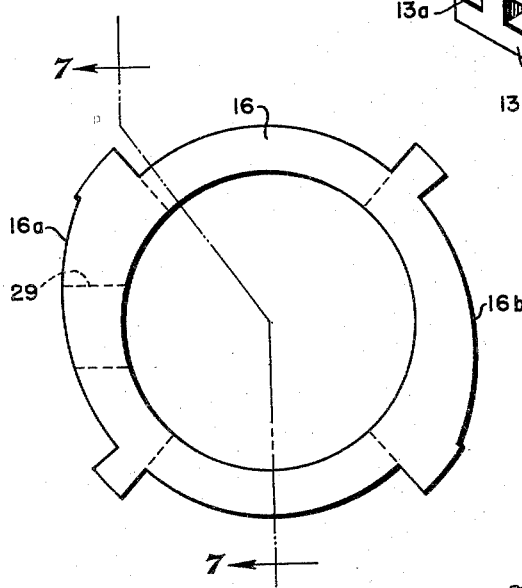
Figure 6 is a side elevation of the cam actuating ring.
Figure 7:
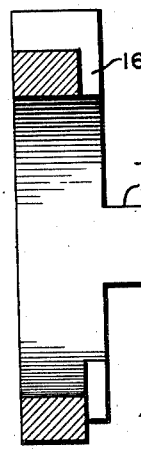
Figure 7 is a sectional elevation of the cam actuating ring on the line 6—6 of Figure 6, looking in the direction of the arrows.

The illustrated embodiment of the invention represented by the drawings shows the improved mechanism of the invention applied to a heavy brake particularly adapted for highway trucks or trailers. It comprises a brake spider 10 which is adapted to be carried by the vehicle axle or axle housing 11. As illustrated, the spider 10 is fixed to the axle housing, but as will be readily apparent from later description, if desired, this spider might be rotated relative to the brake anchor to cause actuation of the brake. The brake spider 10 has arms 12 and 13 which terminate in anchors 12a and 13a for brake shoes 14 and 15, respectively. The brake shoes 14 and 15 respectively, terminate in bifurcated ends as represented by the legs 14a and 15a, respectively. These legs are adapted to straddle the arms 12 and 13 respectively, from the opposite sides thereof. The arm 12 is provided with transverse bosses or projections 12b and 12c which are spaced radially apart sufficiently to receive the legs 14a and 15a respectively of the brake shoes. The projections or bosses serve to position and guide the ends of the brake shoes while the inner surfaces of the notches 14c between the bifurcations abuts the portion of the arm 12 between the projections or bosses 12b and 12c and serves as an anchor for the brake shoe. Likewise the transverse projections or bosses 13b and 13c on the end of the arm 13 serve as anchor and positioning means for the opposite ends of the shoes 14 and 15. Suitable springs 6 and 7 have terminating hooks which engage holes in bosses at the opposite ends of the brake shoes in the usual manner for the purpose of retaining the brake shoes in assembled relation against the arms 12 and 13. A main actuating cam ring 16 which, as illustrated in Figure 2, may be journaled on the hub of the brake spider 10 is held in place by a suitable keeper ring 17. The cam ring 16 is provided with cam surfaces 16a and 16b which are eccentric to the axis of the cam ring. In the assembled brake these surfaces are adapted to be arranged adjacent inner thrust surfaces 14e and 15e, respectively, of the brake shoes. These thrust surfaces are concentric with the braking surfaces of the respective brake shoes and are therefore substantially concentric with the axis of the brake drum 18 when the brake shoes are placed against the latter. A plurality of thrust rollers 20 to 24 inclusive, assembled in a roller cage 25, are adapted to be placed between the cam surfaces 16a and 16b of the cam ring 16 and the adjacent thrust surfaces 14e and 15e of the brake shoes 14 and 15, respectively, whereby upon rotation of the cam ring 16 relative to the brake spider 10 radially outward thrust will be transmitted to the brake shoes. As shown in the drawings, the rollers are of varying diameters and are so spaced that their outer surfaces are adapted to engage simultaneously the cam surfaces 16a and 16b of the cam ring 16 and the thrust surfaces 14e and 15e of the respective brake shoes so that the braking thrust is distributed over a large arc of the brake shoes. This construction also reduces the moment of forces tending to rotate the brake shoes about their anchors during braking action. By this construction there is a minimum variation between the pressure applied to the different parts of the brake shoes.

For purposes of actuating the cam ring 16, a cam 27 fixed to shaft 28 is adapted to engage a boss 29 on the side of the cam ring. The shaft 28 is suitably journaled as at 31 in a bracket which is attached to the axle or axle housing 11. Any suitable mechanism, not shown, may be provided for rotating the shaft 28 for actuating the brake mechanism.

In the modified form of the invention shown in Figures 9 and 10, suitable gears 32 to 36, inclusive, assembled in a suitable cage 37 may be substituted for the rollers previously described. In such modified form gear teeth would be substituted for the smooth surfaces 16a, 16b on the cam ring 16 and the inner thrust surfaces 14e and 15e of the brake shoes. It will be readily apparent that instead of the gears suitable ball bearings arranged in a cage could be used. Also, if desired, a large number of very small ball bearings could be arranged between the eccentric cam surface of the actuating ring 16 and the inner thrust surfaces of the brake shoes for transmitting radial thrust to the brake shoes when the cam ring is rotated relative to the member which carries the anchor for the brake shoe.

In the embodiment illustrated in the drawings, it will be noted that the actuating ring 16 is rotatable on the hub of the spider 10 which is fixed to the axle or axle housing 11. However, it will be readily apparent that, if desired, the cam ring 16, or its mechanical equivalent, could be fixed with respect to the axle or axle housing and the brake spider 10, which carries the anchors for the brake shoes, could be rotated with respect to the cam ring 16 to provide the same actuating action for the brake mechanism. This specification and the accompanying claims should be read with this alternate form in mind. For the purposes of this invention, an axle or the axle housing 11 should be considered mechanical equivalents.

Although the invention has been described in considerable detail, it will be apparent to those skilled in the art that many variations are possible without departing from the inventive concept. It is therefore desired that the invention not be limited except insofar as is made necessary by the prior art and by the appended claims.

I claim:

1. In combination in a brake assembly for association with an axle housing and a relatively rotatable drum, a plurality of brake shoes slidably intercoupled with said axle housing for radial movement relative thereto, said brake shoes having inner thrust surfaces adapted to be substantially concentric with the axis of said housing and brake drum when said shoes engage said brake drum, a second member operably associated for rotation about the axis of the brake assembly, said second member having cam surfaces eccentric to said axis, a plurality of rolling elements of varying diameters and so spaced as to engage said eccentric cam surfaces of said second member and the inner thrust surfaces of said brake shoes whereby when relative rotational movement is effected between said second member and the member carrying the anchors for said brake shoes, the latter will be forced radially outwardly against said brake drum.

2. In combination in a brake assembly for association with an axle housing and a relatively rotatable drum, a plurality of brake shoes slidably intercoupled with said axle housing for radial movement relative thereto, said brake shoes having inner thrust surfaces substantially concentric with the axis of said housing, a cam member mounted for rotation about the axis of said axle housing and having peripheral cam surfaces eccentric to said axis and defining with said inner thrust surfaces curvilinear wedge-shaped spaces therebetween, and a series of freely movable rolling elements of progressively decreasing diameters engaging and corresponding substantially to the convergence of said eccentric cam and thrust surfaces, adapted to be urged toward the rise of said eccentric cam surfaces on relative rotation between said cam member and said brake shoes to force said brake shoes radially outwardly against said drum.

ROBERT A. JEWELL.

REFERENCES CITED

The following references are of record in the file of this patent:

UNITED STATES PATENTS

| Number | Name | Date |
|---|---|---|
| 988,987 | Eners | Apr. 11, 1911 |
| 1,563,636 | Lewis | Dec. 1, 1925 |
| 1,771,348 | Priest | July 22, 1930 |
| 1,924,113 | Evans | Aug. 29, 1933 |
| 1,954,467 | Beettam, Jr. | Apr. 10, 1934 |
| 1,962,939 | Roberts | June 12, 1934 |
| 2,266,079 | Roche | Dec. 16, 1941 |

FOREIGN PATENTS

| Number | Country | Date |
|---|---|---|
| 390,693 | Germany | Feb. 22, 1924 |